UNITED STATES PATENT OFFICE.

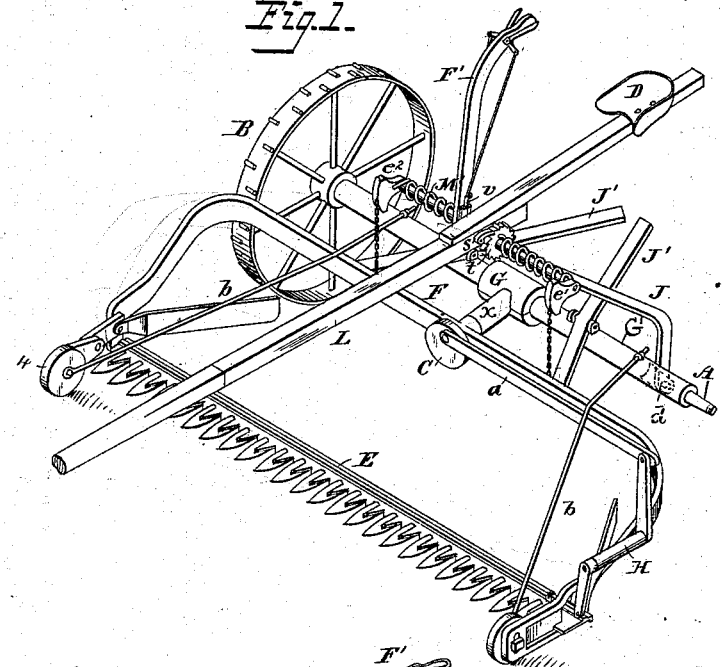

SAMUEL D. MADDIN, OF ST. PAUL, MINNESOTA, ASSIGNOR TO MARY MADDIN, OF MIAMISBURG, OHIO.

HARVESTER.

SPECIFICATION forming part of Letters Patent No. 288,353, dated November 13, 1883.

Application filed February 26, 1883. (No model.)

*To all whom it may concern:*

Be it known that I, SAMUEL D. MADDIN, of St. Paul, Ramsey county, Minnesota, have invented certain Improvements in Harvesters, of which the following is a specification.

My invention has for its object to improve the frame and operating devices of a harvesting-machine, so as to facilitate the manipulation of the same and secure better results.

In the drawings, Figure 1 is a perspective view of sufficient of a harvesting-machine to illustrate my improvements. Fig. 2 is a sectional elevation, and Fig. 3 is a detached view of the frame-adjusting appliances.

The harvester illustrated in the drawing is similar in its general construction to that patented to me November 9, 1880.

A is the axle; B B, the supporting-wheels. F G is the frame, consisting of two parts, the part G being integral with a sleeve, G', inclosing and swinging on the axle, and the part F, which carries the cutter-bar E, being pivoted at $x$ to the part G, so that either side of the cutter-frame can be raised, as in the machine described in the aforesaid patent. The cutter is driven from a crank-wheel, C, by means of a pitman, $a$, and crank-shaft H, as in the aforesaid patented machine.

In the machine described in the aforesaid patent the cutter-bar frame could be tilted by means of a lever, which was fixed to hold the frame in any desired position, there being no yield or accommodation other than could be secured by the flexibility of the parts. To obviate this objection and enable the cutter-bar to float, as it were, freely upon the ground, and pass with ease over obstructions, I interpose one or more springs between the hoisting-lever F' and the frame, which spring tends to keep the lever back in its place near the driver, and prevents it from shaking loosely as the machine is jolted, and also tends to turn the bar and its segmental arms, so as to create an upward draft upon the frame F, thus permitting the latter to rise easily when it meets with any obstruction. At the same time, by manipulating the lever F' and its pawls and bars, as described in the aforesaid patent, either side of the frame may be raised or lowered.

The arrangement of springs is shown best in Fig. 3, in which $w$ is the segment-shaft, to which is attached the segment $e'$ and notched collar $u$. On the shaft turns freely a notched collar, $u'$, segment $e^2$, and the lever F', the pawls $v$ of which may be brought into the notch of either collar. A spring, M, is interposed between the segment $e^2$ and collar $u'$, and a spring, M', between the segment $e'$ and a ratchet-wheel, $t$, which turns freely on the shaft, and is held by a pawl, $s$, so as to maintain any tension applied to the spring. The springs tend to raise the segments, lift the frame, and keep the lever from shaking, but will yield so that the bar will rise and fall over uneven ground.

To overcome the preponderance of weight resulting from the frame F G being entirely at one side of the axle, I extend from the frame G, or the sleeve G' thereof, to the rear arms $d$, to which I pivot the ends of arms J, extending downward from the pole L, the latter projecting to the rear and supporting the driver's seat D, so that the weight of the pole and driver counterbalances that of the frame, and there is a tendency to lift the cutter-bar without any downward pressure on the horse's neck.

In a direct-draft mower, where the bar is in front of the drive-wheels, it has been customary to place the lead-wheels 4 outside of the shoe, which, being between the wheel and the cut, will accumulate grass and occasion difficulty. I arrange the lead-wheels on the inside of the shoe and next to the cutter-bar, so that when a wheel comes in contact with any substance it will roll over it and hold it down until it reaches the knife. I also use a guide-rod, $b$, which is fastened to the journal $i$ of each lead-wheel at the front end, and extends back to the frame, inclining toward the center, and serves to separate the grass and draw it near the center from the side prior to being cut. As this rod is fastened to the journal on which the wheel turns, it will rise and fall with the wheel as the latter is set higher or lower.

Foot-levers J', pivoted to the sleeve G', are connected at the outer end to the swinging frame, so that the driver, by pressing with his foot on either lever, can raise that end of the bar, or he may raise the entire bar by pressing on both levers.

I do not abandon or dedicate to the public any patentable features set forth herein and not hereinafter claimed, but reserve the right to claim the same either in a reissue of any patent that may be granted upon this application or in other applications for Letters Patent that I may make.

I therefore claim—

1. The combination, in a harvester, of a pole having a pivoted bearing upon a projecting portion of the frame G at the rear of and below the journals, and a frame connected to the axle, extending to the front and supporting the cutter-bar, substantially as set forth.

2. The combination of the axle A, arms or rear extension, d, frame F G, extending to the front, and pole L, having its bearings on the arms d below the axle, substantially as set forth.

3. A spring interposed between the operating-lever F' and the swiveling cutter-frame, and connected with the latter, so as to exert an upward draft thereon, substantially as set forth.

4. The lead-wheel 4, arranged inside the shoe and in front of the cutter-bar, in combination with guide-bar b, connected with the journal of the wheel and extending backwardly and inwardly to the frame, as and for the purpose set forth.

5. The foot-levers J', fulcrumed to the axle and connected to the swinging frame at opposides of the center thereof, substantially as set forth.

In testimony whereof I have signed my name to this specification in the presence of two subscribing witnesses.

SAMUEL D. MADDIN.

Witnesses:
JOHN H. RANDALL,
C. S. LEE.